(12) United States Patent
Riskin et al.

(10) Patent No.: US 12,521,464 B2
(45) Date of Patent: Jan. 13, 2026

(54) AIR DISINFECTION APPARATUS FOR USE IN AIR CONDITIONING SYSTEMS

(71) Applicant: TADIRAN CONSUMER AND TECHNOLOGY PRODUCTS LTD., Petach Tikva (IL)

(72) Inventors: Yefim Riskin, Maalot (IL); Maria Khitrik, Petach Tikva (IL)

(73) Assignee: TADIRAN CONSUMER AND TECHNOLOGY PRODUCTS LTD., Petach Tikva (IL)

( * ) Notice: Subject to any disclaimer, the term of this patent is extended or adjusted under 35 U.S.C. 154(b) by 0 days.

(21) Appl. No.: 18/218,697

(22) Filed: Jul. 6, 2023

(65) Prior Publication Data

US 2024/0173454 A1 May 30, 2024

(30) Foreign Application Priority Data

Nov. 28, 2022 (IL) .......................................... 298651

(51) Int. Cl.
*A61L 9/22* (2006.01)
*A61L 9/04* (2006.01)
(Continued)

(52) U.S. Cl.
CPC ................ *A61L 9/22* (2013.01); *A61L 9/046* (2013.01); *A61L 9/12* (2013.01); *F24F 8/24* (2021.01);
(Continued)

(58) Field of Classification Search
CPC ... A61L 9/22; A61L 9/046; A61L 9/12; A61L 2209/15; A61L 2209/16; F24F 8/24; F24F 8/30; F24F 2209/15
See application file for complete search history.

(56) References Cited

U.S. PATENT DOCUMENTS 7,854,900 B2    12/2010  Takeda et al.
2002/0122751 A1*  9/2002  Sinaiko .................. B01D 53/32
                                                     422/186
(Continued)

FOREIGN PATENT DOCUMENTS

CN    101632960 A    1/2010
CN    102644622 A    8/2012
(Continued)

*Primary Examiner* — Regina M Yoo
(74) *Attorney, Agent, or Firm* — Ballard Spahr LLP

(57) ABSTRACT

The present disclosure provides an air disinfection apparatus for use with an air conditioning system configured to create an airflow. The air disinfection apparatus comprises a hollow housing for conveying said airflow therethrough between an air inlet and an opposite air outlet determining an airflow direction; a screen forming a non-ionizing electrode extending along a screen longitudinal extension axis, said non-ionizing electrode being mounted in the housing between the air inlet and the air outlet so that a screen surface is tangential to the airflow direction; a wire forming an ionizing electrode, said wire being suspended in said hollow housing between the air inlet and the air outlet and having a wire axis aligned with the screen longitudinal extension axis so as to face said screen surface; terminals electrically connected to the wire and screen for coupling thereto high and low voltage outputs of a high voltage generator of sufficient voltage to create a corona discharge zone across the airflow between the wire and the screen; wherein the screen includes an ion receiver positioned downstream of the corona discharge zone relative to the airflow direction, said ion receiver being dimensioned to cause ions produced in the corona discharge zone to be attracted so as to prevent release of ions outside of the air disinfection apparatus.

21 Claims, 3 Drawing Sheets

(51) Int. Cl.
 *A61L 9/12* (2006.01)
 *F24F 8/24* (2021.01)
 *F24F 8/30* (2021.01)
(52) U.S. Cl.
 CPC ............ *F24F 8/30* (2021.01); *A61L 2209/15* (2013.01); *A61L 2209/16* (2013.01)

(56) References Cited

U.S. PATENT DOCUMENTS

| | | | |
|---|---|---|---|
| 2002/0122752 A1* | 9/2002 | Taylor | C01B 13/11 422/186 |
| 2002/0127156 A1* | 9/2002 | Taylor | B03C 3/743 422/186 |
| 2002/0134664 A1* | 9/2002 | Taylor | H01T 23/00 422/186.04 |
| 2004/0005252 A1* | 1/2004 | Siess | B01D 53/34 422/186.3 |
| 2004/0033176 A1* | 2/2004 | Lee | B03C 3/12 422/186 |
| 2008/0041138 A1* | 2/2008 | Marra | B03C 3/12 73/31.02 |
| 2008/0093210 A1 | 4/2008 | Edwards | |
| 2009/0010801 A1* | 1/2009 | Murphy | B01D 46/10 422/4 |
| 2010/0043527 A1* | 2/2010 | Marra | B03C 3/41 73/28.02 |
| 2021/0308692 A1* | 10/2021 | Tang | B03C 3/49 |
| 2021/0310387 A1* | 10/2021 | Tang | F01N 3/01 |

FOREIGN PATENT DOCUMENTS

| | | |
|---|---|---|
| CN | 105711379 A | 6/2016 |
| WO | 2020065648 A1 | 4/2020 |

* cited by examiner

AIR DISINFECTION APPARATUS FOR USE IN AIR CONDITIONING SYSTEMS

TECHNOLOGICAL FIELD

The present disclosure relates generally to the field of air purifying apparatuses. More particularly, the present disclosure relates to air purifying apparatuses based on $H_2O_2$ generation.

BACKGROUND

Purification of air is beneficial for reducing the spread of pathogens, especially air-borne pathogens. Common examples include fungi, influenza viruses, and coronaviruses. In certain locations the purification of air might be mandatory, such as in medical facilities, clean rooms and micro-biology laboratories.

The purification methods fall into two broad categories: filtration, and chemical neutralization. In the category of chemical neutralization, corona discharge purifiers work by passing the air through a corona discharge—a current (electrical discharge) that passes through the air, driven by high voltage difference between electrodes. The electrical discharge creates reactive agents (molecules, radicals and ions) that chemically or physically attack and deactivate the pathogens. The current itself might also neutralize the pathogens.

Corona discharge air purifiers are broadly categorized into unipolar and bipolar. Unipolar corona discharge air purifiers include only one ionizing electrode, whereas in bipolar corona discharge air purifiers, both electrodes are ionizing and are kept at a potential difference relative to the ground.

Various purifying devices have been developed based on the corona discharge process, such as ozone generators, unipolar or bipolar ion generators, Hydrogen Peroxide ($H_2O_2$) generators, and electrostatic filters.

GENERAL DESCRIPTION

The present invention aims at providing a novel $H_2O_2$ generator (and in particular at providing an air disinfection apparatus including such a $H_2O_2$ generator) in which the ion release is eliminated, or at least significantly reduced.

The present disclosure also provides an air disinfection apparatus that is easy to manufacture and has low maintenance requirements.

In accordance with the presently disclosed subject matter, there is provided an air disinfection apparatus for use with an air conditioning system configured to create an airflow. In some embodiments, the apparatus may also be used as a standalone device. The air disinfection apparatus comprises a hollow housing for conveying the airflow between an air inlet and an opposite air outlet, determining an airflow direction. The air disinfection apparatus further comprises a screen forming a non-ionizing electrode, extending along a screen longitudinal extension axis. The non-ionizing electrode is mounted in the housing between the air inlet and the air outlet, so that a screen surface is tangential to the airflow direction. The air disinfection apparatus further comprises a wire forming an ionizing electrode, being suspended in the hollow housing between the air inlet and the air outlet. The wire has a wire axis aligned with the screen longitudinal extension axis so as to face the screen surface. The air disinfection apparatus further comprises terminals electrically connected to the wire and screen for coupling thereto high and low voltage outputs of a unipolar or pulsed bipolar high voltage generator of sufficient voltage to create a corona discharge zone across the airflow, between the wire and the screen. The screen includes an ion receiver positioned downstream of the corona discharge zone relative to the airflow direction. The ion receiver is of dimensions to cause ions produced in the corona discharge zone to be attracted thereto, thus preventing release of ions outside of the air disinfection apparatus. It is noteworthy that the feature that the wire faces the screen surface may be understood as the wire and screen are disposed such that the wire is exposed to an electromagnetic influence of the screen so that a current can flow between the screen and the wire through air when the sufficient voltage is created.

In addition to the above features, an air disinfection apparatus, according to the presently disclosed subject matter can optionally comprise one or more of features (i) to (xxv) below, in any technically possible combination or permutation:

i. the ion receiver is dimensioned so as to prevent release of more than 90% of the ions produced in the corona discharge zone, preferably more than 95%, and, even more preferably, more than 99% of the ions.

ii. the ion receiver is of dimensions so that a concentration of the ions in the air released from the air disinfection apparatus is less than 1000 ions per cubic centimeter at 1 m distance from a device outlet.

iii. the screen further comprises an upstream screen portion positioned upstream of the corona discharge zone relative to the airflow direction, wherein the dimensions of the upstream screen portion are at least as large as the dimensions of the downstream ion receiver. The upstream screen portion may be positioned similarly to the downstream ion receiver. This may allow the upstream screen portion to collect ions in the event the air disinfection apparatus is used back to front (i.e., when the air outlet faces the air conditioning airflow output and when the air inlet faces the air conditioning airflow output).

iv. The air disinfection apparatus is free of auxiliary electrodes connectable to a voltage source.

v. The air disinfection apparatus is further configured so that the air inlet and the air outlet can be used reversibly with respect to the airflow from the air conditioning system.

vi. The air disinfection apparatus further comprises one or more focusing electrode accommodated in the discharge zone. The one or more focusing electrode may also be accommodated in the air inlet and/or outlet of the apparatus. The one or more focusing electrode may be free of electrical connection to a voltage source. The one or more focusing electrode may be grounded or connected to low voltage potential relative to the ionizing electrode. The focusing electrode enables the air disinfection apparatus to be used in proximity of grounded surfaces or to surfaces having a high potential of static electricity whose polarity is opposite to the polarity of the ionizing electrode by preventing expansion of the corona discharge zone beyond the physical dimensions of the air disinfection apparatus.

vii. the one or more focusing electrode is made of an electrically conductive material.

viii. the one or more focusing electrode is configured for preventing release of ions, and optionally corona current discharge, outside of the air disinfection apparatus due to electrical influences external to the air disinfection apparatus. In case of formation of possible air path for corona current to be discharged on conductive/ semiconductive surface out of the apparatus, and in proximity of the apparatus (e.g., a coil of a mini split air conditioner, when the apparatus is used with such mini split air conditioner), the focusing electrode will efficiently block this option. It prevents the formation of conductive paths out the device. As a result, the discharge area remains inside the apparatus with no influence form the outside electrical forces. This provides two major advantages: limits the ion release from the apparatus and increases safety of the device.

ix. The air disinfection apparatus comprises a UV light source, configured for decomposing ozone generated by the corona discharge. The UV light source may provide for improvement of disinfection and air purifying abilities of the device. UV light source might be from the UVA, UVB and UVC wavelength ranges, with or without photocatalytic surfaces in contact with. Visible light with appropriate photocatalytic surfaces may be used as well.

X. the screen forms a barrel surrounding the wire.

xi. the screen longitudinal extension axis is aligned with the airflow direction.

xii. the apparatus further comprising (a) hollow insulating holders for suspending the wire and accommodating wire ends therethrough, and (b) interruption barriers at connection portions between said wire and the hollow insulating holders. If any surface in the apparatus is in direct connection of the wire at a given point, then from the said given point and the screen—it is beneficial to provide interruption barriers also called "humidity leakage traps" i.e., in the form of cups, funnel or other surface. This is to avoid the formation of possible current leakage paths from the wire to the screens that could appear in the apparatus with time because of dust and humidity deposition.

xiii. The air disinfection apparatus further comprises attachment means for installation in a ducted air-conditioning system.

xiv. the screen forms a sheet.

xv. the screen comprises two parallel sheets, the wire being mounted between said two sheets.

xvi. the screen longitudinal extension axis is transverse to the airflow direction.

xvii. The air disinfection apparatus comprises connection means for installation to an air-conditioning system.

xviii. The air disinfection apparatus comprises a cleaning mechanism, the cleaning mechanism being configured to wipe the ionizing electrode. Existing corona discharge-based devices suffer from a disadvantage that the operation of these generators is problematic, because of the need to periodically clean all the elements of the corona discharge system from dust contained in the air stream, including cleaning of the ionizing electrode.

xix. the cleaning mechanism is further configured to wipe the non-ionizing electrode.

xx. the cleaning mechanism is further configured to wipe the one or more focusing electrodes.

xxi. the cleaning mechanism includes a wiper configured to be displaced within the housing to cause concurrent wiping of any of the ionizing electrode, non-ionizing electrode, and focusing electrode.

xxii. the cleaning mechanism further comprises one or more shafts extending parallel to the screen longitudinal extension axis, the wiper being coupled thereto so as to be axially guided within the housing.

xxiii. the shaft is configured to be axially rotatable and comprises a screw threading on an external surface thereof, and the wiper includes a nut cooperating with said screw threading, such that rotation of the shaft causes displacement of the wiper along the shaft.

xxiv. said cleaning mechanism is configured to be driven by a motor.

xxv. the shaft forms a focusing electrode.

xxvi. the air disinfection apparatus is configured to be mounted on an air conditioning system airflow input or on an air conditioning system airflow output.

In accordance with the presently disclosed subject matter, there is also provided a method for generating hydrogen peroxide, the method comprising: providing a hollow housing for conveying an airflow therethrough between an air inlet and an opposite air outlet determining an airflow direction; providing a screen forming a non-ionizing electrode extending along a screen longitudinal extension axis, said non-ionizing electrode being mounted in the housing between the air inlet and the air outlet so that a screen surface is tangential to the airflow direction; providing a wire forming an ionizing electrode, said wire being suspended in said hollow housing between the air inlet and the air outlet and having a wire axis aligned with the screen longitudinal extension axis so as to face said screen surface; providing terminals electrically connected to the wire and screen for coupling thereto high and low voltage outputs of a high voltage generator of sufficient voltage to create a corona discharge zone across the airflow between the wire and the screen; wherein the screen includes an ion receiver positioned downstream of the corona discharge zone relative to the airflow direction, said ion receiver being dimensioned to cause ions produced in the corona discharge zone to be attracted so as to prevent release of ions outside of the air disinfection apparatus; creating a corona discharge zone between said ionizing electrode and said non-ionizing electrode; passing an airflow containing water molecules through said corona discharge zone, to thereby cause conversion of some of the water molecules into hydrogen peroxide.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

A general working principle of the air disinfection apparatus disclosed herein is converting humidity, present in air, to hydrogen peroxide ($H_2O_2$), by the influence of corona discharge. The hydrogen peroxide is released from the device into the treated airspace with the airflow and may act as a potent biocide, thereby disinfecting the airspace where an apparatus outlet is directed to, an airflow flowing through the air disinfection apparatus and the space close to the device in absence of airflow.

Figure 1:
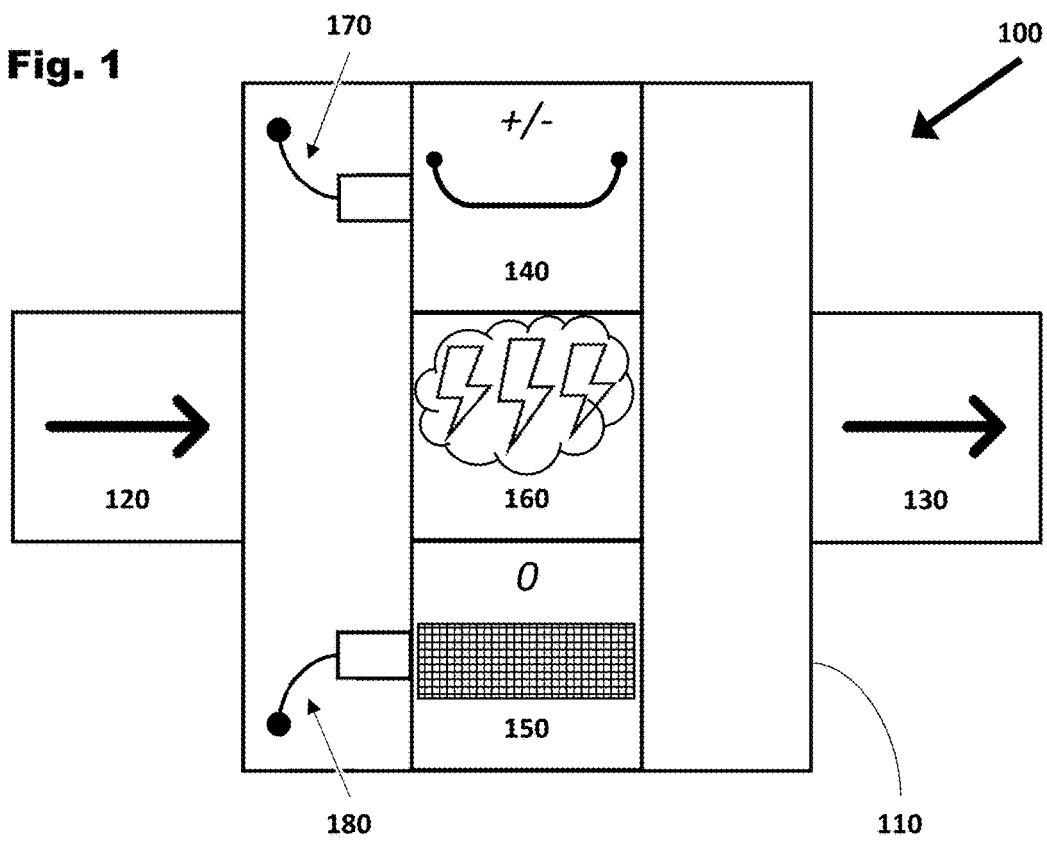
FIG. 1 is a diagram illustrating, generally, an air disinfection apparatus according to the present disclosure.

FIG. 1 shows a box diagram, schematically illustrating an air disinfection apparatus 100 according to a broad aspect of the present disclosure. The air disinfection apparatus may include a housing 110 for conveying an airflow therethrough. The housing 110 may serve as a casing for containing and/or mounting the components of the air disinfection apparatus. The housing 110 may also serve a safety purpose of preventing high-voltage electrical components from being accidentally accessed i.e. it may be configured so that a standard human hand cannot access said high-voltage electrical components (e.g. the wire and/or the screen).

The air disinfection apparatus may include an air inlet 120 and may include an air outlet 130. The air inlet 120 may provide an input for an airflow to the air disinfection apparatus 100. The air outlet 130 may provide an output for a disinfected airflow from the air disinfection apparatus 100. In some embodiments, the air disinfection apparatus may include attachment means configured for attaching the air disinfection apparatus to a source of airflow such as an air conditioning system or fan. In some embodiments, the air disinfection apparatus may be configured for attachment to pipes, ducts, and the like, so as to convey the disinfected airflow into a target area. For example, in some embodiments, the air disinfection apparatus may be incorporated to a ducted air conditioning system. In some embodiments, the air inlet 120 of the air disinfection apparatus may fluidly communicate with a fan supplying an airflow, and the air outlet 130 may fluidly communicate with a duct that passes the disinfected airflow to a room. For example, the air disinfection apparatus may be installed in the return air side or in the air supply outlet of the air conditioner ductwork, or in the indoor unit between the filter and coil (e.g., in split air-conditioning systems) or in the air supply inlet.

In some embodiments, the air disinfection apparatus may be configured for reversible use i.e., the air outlet 130 may be used as air inlet to the apparatus. The interchangeability between the air inlet 120 and the air outlet 130 means that the air inlet 120 may be used for outlet of air from the air disinfection apparatus 100 and the air outlet 130 may be used for inlet of air to the air disinfection apparatus 100. In other words, for example, in embodiments where the air disinfection apparatus 100 may be installed in an air conditioning system, the air disinfection apparatus 100 may be installed in such a manner such that the air outlet 130 may face the air conditioning airflow output, and the air inlet 120 may face the air conditioning airflow output. In yet other words, there may be no functional distinction between the air inlet 120 and the air outlet 130. The distinction between the air inlet and the air outlet may depend not on any feature of the air disinfection apparatus 100, but may depend on any feature, object, or entity that is external to the air disinfection apparatus 100.

The air disinfection apparatus may include a wire acting as an ionizing electrode 140 and may include a non-ionizing electrode 150. The ionizing electrode 140 and the non-ionizing electrode 150 may be mounted inside the housing 110, between the air inlet 120 and the outlet 130. In the space between the ionizing electrode 140 and the non-ionizing electrode 150, a corona discharge may occur in a corona discharge zone 160 when sufficient voltage difference is applied between the wire and the screen. The non-ionizing electrode 150 may comprise a conductive screen. In the present disclosure, the ionizing electrode 140 may be referred to as a wire and the non-ionizing electrode 150 may be referred to as a screen.

The screen 150 may comprise an ion receiver. The ion receiver may be an extension of the screen 150 downstream from the corona discharge zone 160 towards the air outlet 130. The ion receiver may be dimensioned and positioned so as to trap ions that may be released from the corona discharge zone 160. This advantageously may prevent introducing ions in the disinfected air supplied by the air disinfection apparatus. The trapping of ions may be achieved by a geometry of the ion receiver, i.e., the ion receiver may be dimensioned to cause ions produced in the corona discharge zone to be attracted, thus preventing the release of ions outside of the air disinfection apparatus. The configuration of the ion receiver may obviate the need for auxiliary electrodes. In other words, the ion receiver may prevent the release of ions outside of the air disinfection apparatus, irrespective of the presence of any auxiliary electrodes i.e. whether or not auxiliary electrodes are connected to a voltage source.

In some embodiments, at least 90% of the ions produced by the corona discharge may be trapped by the ion receiver. In some embodiments, at least 95% or even 99% of the ions may be trapped by the ion receiver. In some embodiments, the ion concentration in the disinfected air supplied by the air disinfection apparatus may not surpass $3 \times 10^3$ ions per $cm^3$ at 1 meter distance from the device, preferably not surpass 1000 ions per $cm^3$ at 1 meter distance from the device, more preferably not surpass 500 ions per $cm^3$, more preferably not surpass 300 ions per $cm^3$.

In some embodiments, the screen 150 may comprise an upstream screen portion. The upstream screen portion may be an extension of the screen 150 upstream from the corona discharge zone 160 towards the air inlet 120. The upstream screen portion may trap ions that may be released from the corona discharge zone 160 which may occur in the upstream zone as well, between the ionizing electrode 140 and the screen 150. An upstream portion may be required if a backflow of ions occurs. For example, if the airflow is very slow or absent, or if the temperature in the corona discharge zone is very high. In some embodiments, the dimensions of the upstream screen portion may be at least as large as the dimensions of the ion receiver. The upstream screen portion may also enable using the apparatus back to front while maintaining the ion release prevention.

In some embodiments, the ends of the wire 140 may be outside of the corona discharge zone 160. In some embodiments, the ends of the wire 140 may be insulated, preventing corona discharge from the ends of the wire. In some other embodiments, the wire 140 may comprise enlarged ends, reducing the electrical field in the vicinity of the ends of the wire, preventing corona discharge from the ends of the wire. The Applicant has found that positioning the ends of the wire 140 outside the corona discharge zone 160 may extend the wire's durability. Positioning the ends of the wire 140 outside the corona discharge zone 160 may prevent exposing the ends of the wire 140 to high electrical fields. The benefit of this configuration, in comparison to the configuration where the end of the wire 140 is in the corona discharge zone 160, may include reduced dust adhesion, reduced degradation of the wire electrode, or the ability to maintain higher voltage. These benefits may also be present in comparison to traditional needle-like ionizing electrodes.

The wire 140 may stretch along a wire axis. In some embodiments, the wire axis may be aligned with the screen longitudinal extension axis, that is the wire 140 may be suspended in the housing to face the screen 150 so as to efficiently utilize a surface area of the screen 150. In some embodiments, the wire 140 may be twisted to have the shape of a coil, the shape of a helix, or have a serpentine shape. In some embodiments, the wire 140 may be placed in parallel towards the screen 150 to achieve homogeneous spread of corona discharge current, that increases the lifetime of the wire and the disinfection effectiveness. In some embodiments, the wire 140 may be placed with slope (i.e., inclined) towards the screen 150.

The wire 140 may include a first electrical terminal 170 and the screen 150 may include a second electrical terminal 180. The first and second terminals may be electrically connected to the wire and screen for coupling thereto high and low voltage outputs of a high voltage generator, whereby the corona discharge zone 160 may be created across the airflow between the wire and the screen. In some embodiments, the high voltage generator may be a unipolar high voltage generator. In some embodiments, the high voltage generator may be a bipolar high voltage generator. In some embodiments, the high voltage generator may be a bipolar high voltage generator operated in switchable mode. For instance, in case of positive corona discharge, the wire 140 may be under +3 kV voltage and the screen/s 150 may be under −3 kV voltage.

As indicated above, the screen 150 may comprise an ion receiver that may trap ions that may be released from the corona discharge zone 160. However, external electric fields may influence, e.g., a grounded copper coil of the AC minisplit, where the device may be installed (or other grounded surfaces or high-voltage sources) and at least partially counter the action of the ion receiver or electron donor/acceptor, and cause the release of ions outside of the air disinfection apparatus or cause the corona current to be discharged on this conductive surface close enough to the wire.

Overcoming such external influences imposes a challenge. Blocking the path of the ions implies constricting the airflow. Constricting the airflow may incur a penalty in air throughput and power consumption. In addition, the dimensions or the orientation of the apparatus are limited. Extending the ion receiver, or changing the orientation of the air outlet, may not be feasible. Further, increasing the voltage in the system, in order to reduce the significance of the external influence, may result in safety hazards, for example, if the required voltage may reach the dielectric-breakdown of the insulation.

In order to overcome these difficulties, the Applicant found that it may be sufficient to add an electrode, that may be referred to as focusing electrode, in the air disinfection apparatus. The focusing electrode may be free of electrical connection capability. The focusing electrode may be positioned in the corona discharge zone e.g., in the ions' path from the corona discharge zone to the source of the external influences. Some of the ions may be trapped on the focusing electrode. An electric field produced by the trapped ions on the focusing electrode may advantageously deflect the ions towards the ion receiver. The focusing electrode may be made of an electrically conductive material. The focusing electrode may be, but not limited, configured to extend substantially parallel to the wire. In other words, a longitudinal axis of the focusing electrode may be, but not limited, substantially parallel to the wire axis. A focusing electrode may be a rod, a net or any other geometry which suits to the device structure.

The focusing electrode prevents the release of ions outside of the air disinfection apparatus, due to electrical influences external to the air disinfection apparatus, and solves the aforementioned problem associated with external influences. The focusing electrode may be configured to have a cross section that is much smaller than the cross section of the housing or the air outlet, to avoid constricting the airflow. The focusing electrode may be placed inside the air disinfection apparatus. The focusing electrode may also eliminate the need for higher voltage.

In some embodiments, the focusing electrode may not be connected to a voltage source. In such embodiments, ions trapped on the focusing electrode may charge the electrode, creating an electrical field.

In some embodiments, the focusing electrode may be made from a conductive material. This may equalize the potential across the focusing electrode. In some embodiments, the focusing electrode may be placed inside the corona discharge zone. In some embodiments, the focusing electrode may have an electrode axis and may be placed to face the screen surface.

As indicated above, the air disinfection apparatus may convert humidity present in the air to hydrogen peroxide ($H_2O_2$). In some embodiments, humidity may be introduced to an airflow by the air disinfection apparatus. Introduction of humidity may be advantageous if humidity that may already be present in the ambient air, may be insufficient to produce a required concentration of hydrogen peroxide. For example, if the ambient air is of very low humidity, such as below 10% humidity.

Figure 2:
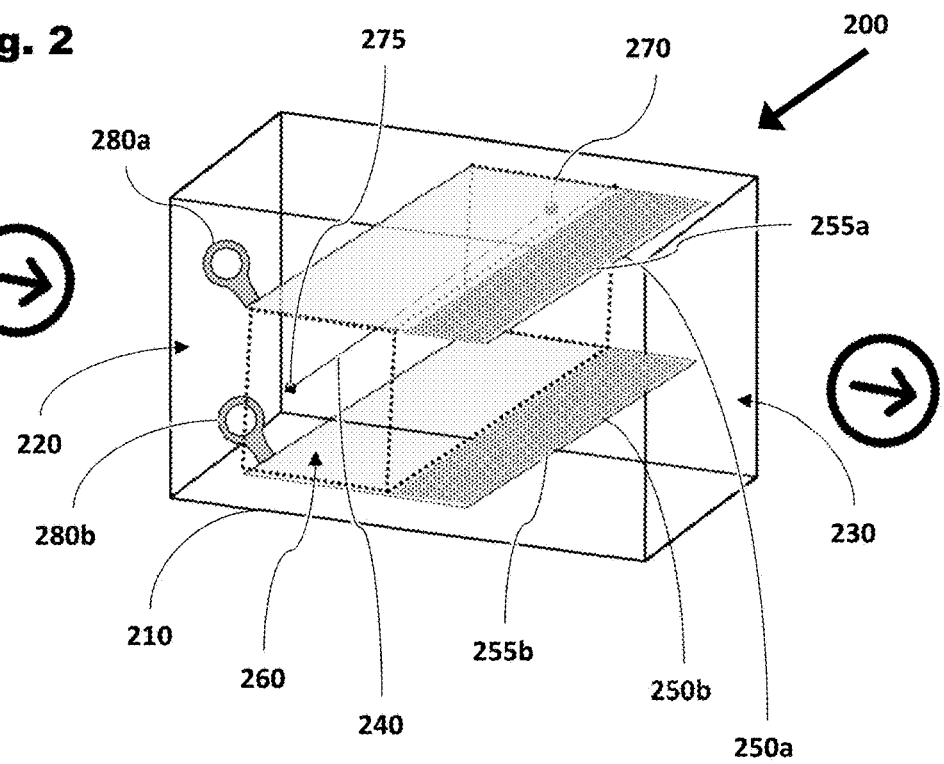
FIG. 2 shows a schematic illustration of an air disinfection apparatus according to embodiments of the present disclosure.

FIG. 2 shows a schematic illustration of an air disinfection apparatus 200 according to embodiments of the present invention. The air disinfection apparatus may include a hollow housing 210 for conveying an airflow therethrough. Examples of airflow sources include air conditioning systems, fan, and ventilation systems. The airflow may be conveyed between an air inlet 220 and an air outlet 230, determining an airflow direction indicated in FIG. 2 by encircled arrows. The housing 210 may be shaped as a box and the air inlet 220 and air outlet 230 may be form openings in opposite surfaces of the housing 210. In some embodiments, the housing 210 may comprise attachment means configured to connect the air disinfection apparatus 200 to other devices, for example, fans, filters, humidifiers, other air purification devices, air ducts, or air-conditioning systems.

The air disinfection apparatus 200 may include a non-ionizing electrode (screen). The screen may comprise an upper sheet 250a and a lower sheet 250b. The upper sheet 250a and the lower sheet 250b may each be made from a rectangular conductive plate. In some embodiments, the upper sheet 250a and/or the lower sheet 250b may be made from a conductive plate. The screen may be mounted inside the housing 210, between the air inlet 220 and the air outlet 230.

The screen may extend along a longitudinal extension axis, that may be transverse to the airflow direction. The longitudinal extension axis may be defined by the longer edge of the rectangular screen/sheets. The screen may be positioned to be tangential to the airflow. This may allow to preserve a satisfying airflow. In other words, a normal to the surface of the screen may be normal to the direction of the airflow. In some embodiments, the screen may be inclined with respect to the wire.

The air disinfection apparatus 200 may include an ionizing electrode (wire) 240. The wire 240 may be suspended inside the housing 210, between the air inlet 220 and the air outlet 230. The wire 240 may be mounted (in the space) between the upper sheet 250a and the lower sheet 250b of the screen. The wire 240 may have a wire axis, and the wire axis may be transverse to the airflow direction. The wire axis may be aligned with the screen's longitudinal extension axis, so that the wire faces the screen surface. The alignment of the wire axis and the screen longitudinal extension axis may enhance the efficiency of the air disinfection apparatus 200, by efficiently utilizing the wire 240 and the sheets of the screen 250a, 250b.

In the space between the wire 240 and the two sheets 250a, 250b of the screen, a corona discharge zone 260 may be present. The approximate boundaries of the corona discharge zone 260 are marked with finely dashed lines on FIG. 2.

The wire 240 may include a first electrical terminal 270 (symbolized by a small oval). The screen may comprise a second electrical terminal, where the upper sheet 250a may include an upper second electrical terminal 280a and the lower sheet 250b may include a lower second electrical terminal 280b. The upper second terminal 280a and the lower second terminal 280b are symbolized by ring-terminals. The electrical terminals may be electrically connected to the wire and screens for coupling thereto high and low voltage outputs of a high voltage generator, thereby creating a corona discharge zone 260 across the airflow between the wire and the screen.

As indicated above, the wire 240 may be suspended between the sheets of the screens 250a, 250b. The suspension points may comprise a dedicated suspension point 275 and the first electrical terminal 270. In some embodiments, the wire 240 may be subject to spring tension to prevent dulling of the wire 240, in order to prevent contact between the wire 240 and any of the screens 250a, 250b, and forming a short-circuit condition.

The screen may comprise an ion receiver 255a, 255b. The ion receiver 255a, 255b may comprise an extension of one or both of the sheets of the screens 250a, 250b towards the air outlet 230. In other words, the ion receiver 255a, 255b may be positioned downstream of the corona discharge zone 260 relative to the airflow direction. The ion receiver 255a, 255b is marked with hatched lines in FIG. 2. The ion receiver 255a, 255b may be dimensioned (i.e., the geometry of the ion receiver may be configured) to prevent the released ions to reach the air outlet 230, and to subsequentially be introduced to the disinfected air supplied. In some embodiments, the wire can be placed parallel or vertical relative to the airflow direction.

The design of the air disinfection apparatus 200 may be useful for incorporation of the air disinfection apparatus 200 into air conditioning systems. In some embodiments, the air disinfection apparatus 200 may fit into ducts (having rectangular cross section) of a ducted air conditioning system. Alternatively, in some embodiments, the air disinfection apparatus 200 may be configured for attachment to an indoor unit of a split air conditioning system.

The air disinfection apparatus may further comprise a cleaning mechanism (not shown) configured to wipe the ionizing electrode, the non-ionizing electrode, the one or more focusing electrode and/or the ion receiver. In some embodiments, the cleaning mechanism includes a wiper configured to be displaced within the housing to cause concurrent wiping of any of the ionizing electrode, non-ionizing electrode, one or more focusing electrode and/or ion receiver. The cleaning mechanism may further comprise one or more shafts (optionally the focusing electrode may act as said shaft) extending parallel to the screen longitudinal extension axis, the wiper being coupled thereto so as to be axially guided within the housing. One of said shaft may be configured to be axially rotatable and comprises a screw threading on an external surface thereof, and the wiper includes a nut cooperating with said screw threading, such that rotation of the shaft may cause displacement of the wiper along the shaft. Furthermore, the cleaning mechanism may be configured to be driven manually or by a motor.

The air disinfection apparatus may further include a focusing electrode (not shown). The focusing electrode or electrodes may be placed inside the air disinfection apparatus 200. The focusing electrode may prevent the release of ions outside of the air disinfection apparatus 200, due to electrical influences external to the air disinfection apparatus, e.g., high voltage sources such as high-power transformers or grounded coils of the AC minisplit. The focusing electrode may be free of electrical connection capability. Some ions may be trapped on the surface of the focusing electrode, thus charging the focusing electrode with the charge polarity the same as for the ions. The electric field produced by the trapped ions may deflect ions produced in the corona discharge zone towards the ion receiver. The focusing electrode may be positioned in the corona discharge zone e.g., in the ions' path from the corona discharge zone. The focusing electrode may be configured to extend substantially parallel to the wire. The focusing electrode may have an electrode axis and may be positioned so as to face the screen surface. The focusing electrode and the wire may be positioned such that a plane supporting the wire axis and the electrode axis is parallel to the screen. Positioning the focusing electrode may be performed differently in space in order to efficiently deflect ions towards the ion receiver, e.g., it may be placed as at least one rod that is vertical to the wire axes or constructed in the net shape. The focusing electrode may be made of an electrically conductive material, in order to equalize the potential across the focusing electrode and to prevent spots of low potential that may cause ineffective deflection of ions towards the ion receiver. The focusing electrode may be configured to have a cross section that is much smaller than the cross section of the housing or the air outlet to avoid constricting the airflow. The efficiency of the focusing electrode in focusing the corona discharge zone may depend on a surface area of the focusing electrode that may face the ionizing electrode, and on the distance between the ionizing and focusing electrodes. In embodiments where the focusing electrode may have a circular cross section, the dependency on the surface area of the focusing electrode that may face the ionizing electrode may translate to a dependency on the diameter of the focusing electrode. The focusing electrode may also eliminate the need for higher voltage in order to screen external electrical influences.

Figure 3:
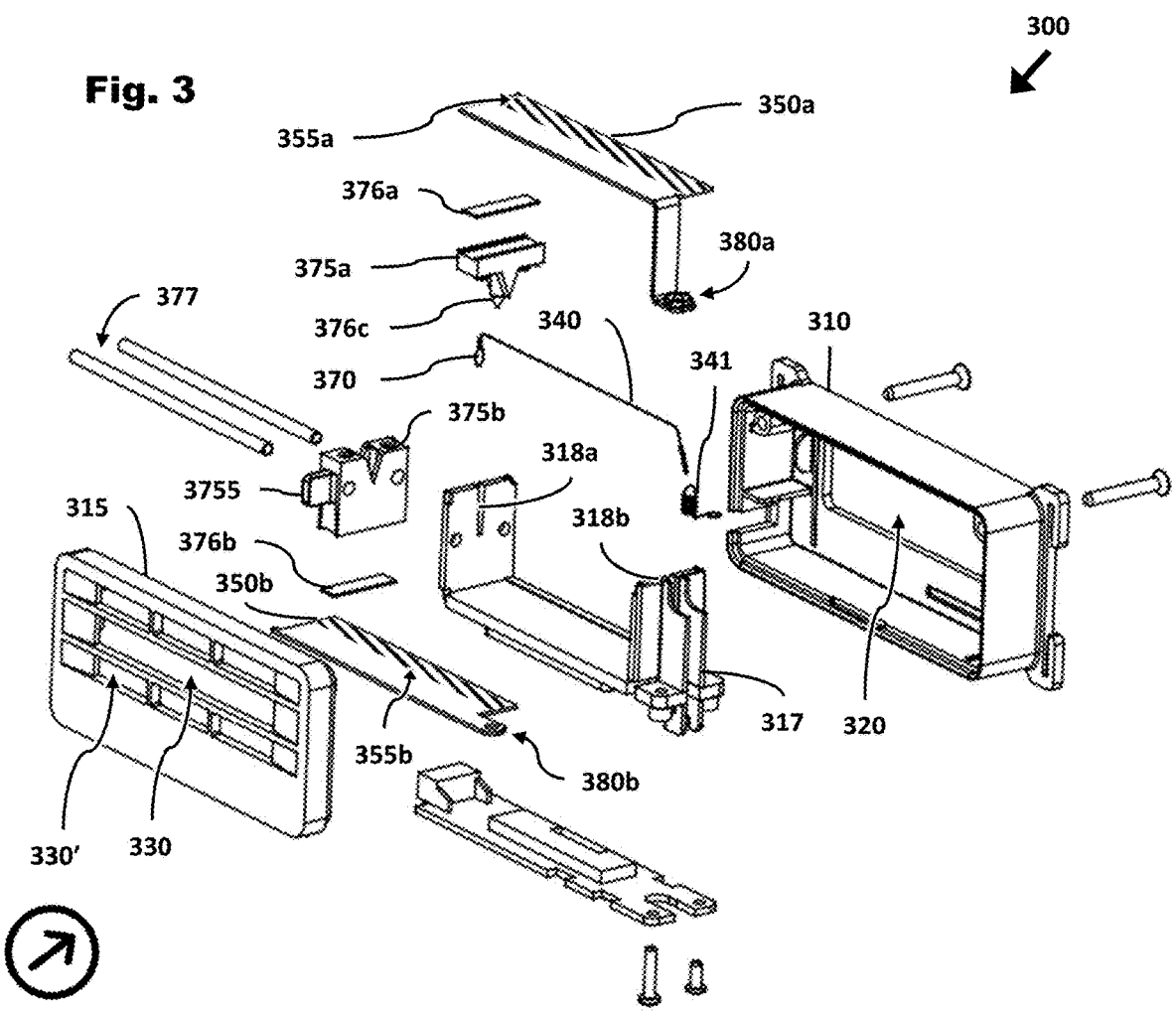
FIG. 3 illustrates an exploded view of various components of an air disinfection apparatus according to embodiments of the present disclosure.

FIG. 3 illustrates an exploded view of various components of an air disinfection apparatus 300 according to embodiments of the present disclosure. The air disinfection apparatus 300 may include a hollow housing 310 for conveying an airflow therethrough. The housing 310 may have a housing opening 320 that may serve as an air outlet. The housing 310 may be covered by a housing cover 315 opposite the housing opening 320. The housing cover 315 may include a cover opening 330 that may serve as an air inlet. The housing cover 315 may further comprise secondary openings 330'. As explained above, the air disinfection apparatus is useful in collaboration with an air conditioning system outputting an airflow. In FIG. 3, a direction of the airflow from the air conditioning system (not shown) is indicated by an encircled arrow. The air disinfection apparatus 300 may include a frame 317 configured for mounting different components inside the housing. The frame 317 may be placed inside the housing 310.

The air disinfection apparatus 300 may further comprise a screen, mounted in the housing 310, on the frame 317, between the air inlet 330 and the air outlet 320. The screen may comprise an upper sheet 350a and a lower sheet 350b. The two sheets 350a, 350b may each be made from a rectangular conductive plate. The upper sheet 350a may be parallel to the lower sheet 350a. A longitudinal extension axis of the screen, defined by the longer edge of the sheets of the screen 350a, 350b, may be transverse to the airflow. The screen may be tangential to the airflow, in order to not interrupt the airflow.

The air disinfection apparatus 300 may comprise an ion receiver, in order to attract ions, so as to prevent release of ions outside of the air disinfection apparatus 300. The ion receiver may be positioned downstream of the corona discharge zone relative to the airflow direction. The ion receiver may comprise an upper sheet extension 355a and may include a lower sheet extension 355b. The upper sheet extension 355a and the lower sheet extension 355b are marked with dotting.

The air disinfection apparatus 300 may comprise a wire 340 that may be suspended between the air inlet 330 and the air outlet 320 and may be mounted on the frame 317 using notches 318a, 318b. The wire 340 may be suspended between the upper sheet 350a and the lower sheet 350b. The wire 340 may be spring tensioned by a spring 341, in order to prevent a short circuit condition by dulling of the wire 340 from e.g., thermal expansion. The ends of the wire 340 may be placed outside the corona discharge zone. An axis of the wire 340 may be aligned with a longitudinal extension axis of the screen in order to face the screen surface, for efficient operation of the air disinfection apparatus 300.

The wire 340 may include a first electrical terminal 370 and the screen may include a second electrical terminal. The first electrical terminal 370 may be a loop made from the end of the wire 340 and may be placed outside the corona discharge zone. The second electrical terminal may comprise an upper terminal 380a that may be electrically connected to the upper sheet 350a, and a lower terminal 380b that may be electrically connected to the lower sheet 350b. The upper second electrical terminal 380a and the lower second electrical terminal 380b may be configured as nuts, that is, threaded holes, that may match screws or bolts, in order to attach the two sheets of the screen 350a 350b to the frame 317. The electrical terminals may be used for coupling the wire 340 and the screen to high and low voltage outputs of a high voltage generator, correspondingly, thereby a corona discharge zone may be created across the airflow between the wire 340 and the screen.

The air disinfection apparatus 300 may include a cleaning mechanism, that may be configured to enable cleaning of one or more electrodes. The cleaning mechanism may in particular enable removing of dust from the one or more electrodes or a part of it. The cleaning mechanism may comprise a wiper configured to be displaceable in the housing to enable wiping of the one or more electrodes. The wiper may comprise an upper wiper section 375a that may be configured for wiping the upper sheet 350a, and a lower wiper section 375b that may be configured for wiping the lower sheet 350b. The upper wiper section 375a may include an upper wiping surface 376a and the lower wiper section 375b may include a lower wiping surface 376b. The wiper may be installed inside the housing 310. The cleaning mechanism may be configured to be operated manually. The cleaning mechanism may include a handle 3755 that may protrude outside of the housing cover 315. The handle 3755 may be attached to the lower wiper section 375b. The handle 3755 may enable a user to displace the wiper by hand, in order to wipe the one or more electrodes. The cleaning mechanism may also clean (by wiping) the wire 340 through a wire wiping tip 376c that may be attached to the upper wiper section 375a.

The cleaning mechanism may further comprise one or more shafts 377 that may be used as guides for the wiper. The shafts 377 may extend parallel to the screen longitudinal extension axis and the wiper may be coupled to the shafts 377 so as to be axially guided within the housing. In some embodiments, the shafts 377 may also function as focusing electrodes, and may be free of connections to a voltage source. In some embodiments, the cleaning mechanism may also wipe one or more focusing electrodes. In some embodiments, the wiper may be displaced within the housing to cause concurrent wiping of any of the electrodes, i.e., it may simultaneously clean any of the ionizing electrode, non-ionizing electrode, and focusing electrode, preferably all the electrodes the air disinfection apparatus 300 comprises.

The design of the air disinfection apparatus 300 may be useful for incorporation of the air disinfection apparatus 300 to air conditioning systems, preferably by attachment to indoor units of split air conditioning systems.

Figure 4:
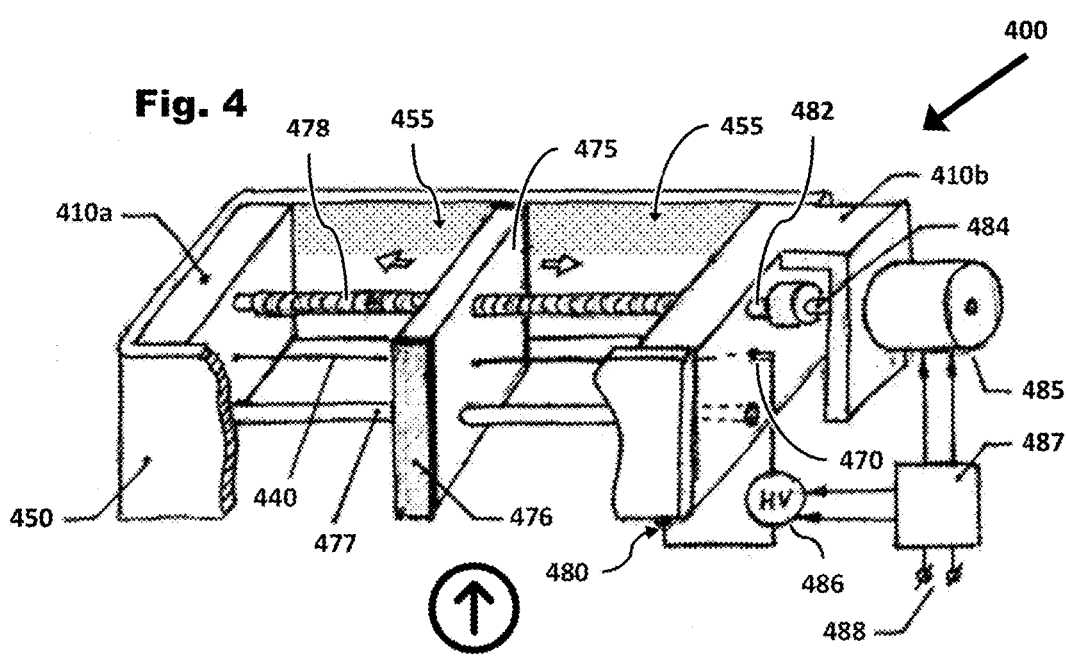
FIG. 4 illustrates a cut-out view of an air disinfection apparatus according to embodiments of the present disclosure.

FIG. 4 illustrates a cut-out view of an air disinfection apparatus 400 according to embodiments of the present disclosure. This illustration is semi-schematic, in the sense that for some components, representing symbols are shown. The air disinfection apparatus 400 may include a hollow housing for conveying an airflow therethrough, between an air inlet and an opposite air outlet, determining an airflow direction. The direction of the airflow is shown with an encircled arrow. Some components of the air disinfection apparatus may be mounted inside the housing on walls 410a, 410b.

The air disinfection apparatus 400 may comprise a screen 450 that may be configured as a U-shaped plate. One leg of the U-shape is partially removed in this illustration, in order to show different components. The screen 450 may be positioned inside the housing (not shown) between the air inlet and the air outlet, and may be mounted on the walls 410a, 410b. The surface of the screen 450 may be tangential to the airflow direction, in order to not obstruct the airflow. The screen 450 may extend along a screen longitudinal extension axis, defined as the axis that may be parallel to the two legs of the U-shape. The screen longitudinal extension axis may be transverse to the airflow.

The screen 450 may comprise an ion receiver 455, marked with dotting. The ion receiver may be positioned downstream of the corona discharge zone, relative to the airflow direction. The ion receiver may be dimensioned to cause ions produced in the corona discharge zone to be attracted, so as to prevent release of ions outside of the air disinfection apparatus.

The air disinfection apparatus 400 may comprise a wire 440 that may be suspended inside the housing between the air inlet and the air outlet. The wire 440 may be positioned in between the legs of the screen 450, and may be hung on the walls 410a, 410b. The wire 440 may have a wire axis and may be positioned so the wire axis may be aligned with the screen longitudinal extension axis so as to face the screen surface, i.e., the wire may be positioned transverse to the direction of the airflow.

The wire 440 may include a first electrical terminal 470 and the screen 450 may comprise a second electrical terminal 480. The electrical terminals may be electrically connected to the wire 440 and screen 450 for coupling them, respectively, to high and low voltage outputs of a high voltage generator of sufficient voltage to create a corona discharge zone across the airflow between the wire and the screen.

The air disinfection apparatus 400 may comprise a wiper 475 to wipe the screen 450, where the wiper 475 may include a dedicated wiping surface 476 in order to wipe or scratch the screen 450. The wiper 475 may be displaced along the longitudinal extension axis of the screen 450 in order to wipe the screen 450. The wiper 475 may reciprocate along the longitudinal extension axis of the screen 450, that is, the displacement may be bi-directional, e.g., from left to right, and then from right to left. The reciprocation is symbolized by two hollow arrows. In some embodiments, the cleaning may be performed by half a cycle of reciprocation, e.g., one displacement from left to right (or from right to left) may be sufficient to clean the electrodes.

The wiper 475 may be guided by two shafts 477, 478, that may keep the wiper 475 positioned correctly relative to the screen 450. The shafts 477, 478 and the wire 440 may pass through dedicated holes in the wiper 475. The shafts may be supported by the walls 410a 410b and may be oriented along the longitudinal axis of the screen, or, in other words, the shafts 477, 478 may be parallel to the wire 440 and transverse to the airflow. In some embodiments, the wiper 475 may also be configured to wipe the wire 440. In some embodiments, the wiper 475 may also be configured to wipe at least one of the shafts 477, 478.

The shafts 477, 478 may also fulfil the function of focusing electrodes, in order to prevent the releasing of ions outside of the air disinfection apparatus due to external influences. The focusing electrodes may be not connected to a high voltage source.

One shaft 478 may have a screw-thread embedded on its outer surface and the wiper 475 may have a nut (i.e., a hole with internal threading) that matches the screw-thread of the shaft 478, forming a screw-nut pair. The shaft 478 with the screw-threading may be referred to in the following as the threaded shaft, where the shaft 477 that may not have screw-threading may be referred to as a plain shaft. The screw-nut pair formed by the threaded shaft 478 and by the wiper 475 may provide a mechanism to displace the wiper 475 in order to wipe the screen 450. The threaded shaft 478 may be rotatable about the longitudinal axis, and the screw threading on the threaded shaft 478, by acting on the nut, may drive the wiper 475 along the screen 450. In some embodiments, the air disinfection apparatus 400 may comprise bearings configured to facilitate rotation of the threaded shaft 478.

It is to be noted that the screw-nut pair formed by the threaded shaft 478 and by the wiper 475 may apply a torque to the wiper 475, that may act to rotate the wiper 475 about the threaded shaft 478 instead of displacing the wiper 475. However, the torque may be counteracted by the plain shaft 477 and by the walls 410a, 410b to which the threaded shaft is coupled so as to be axially fixed, thus the wiper 475 may not rotate.

The air disinfection apparatus 400 may comprise a motor 485 configured to rotate the threaded shaft 478, or, in other words, the cleaning mechanism may be configured to be driven by the motor 485. The motor may comprise a motor shaft 484 and a connector 482 configured to connect the motor 485 to the screw shaft 478. In embodiments where the screw shaft 478 may fulfil the function of a focusing electrode, the connector 482 may be insulating, in order to prevent damage to the motor 485.

The air disinfection apparatus 400 may comprise a high voltage source 486 (illustrated symbolically) that may supply the required voltage to cause the corona discharge. The high voltage source 486 may be electrically connected to the wire 440 through the first terminal 470 and to the screen 450 through the second electrical terminal 480.

The air disinfection apparatus 400 may comprise a control unit 487 (illustrated symbolically), in order to automatically control the function of the different components. The control unit 487 may set the voltage and current supplied to the wire 440 and the screen 450, may operate the motor 485, may receive operation commands, or give indications on the state of the air disinfection apparatus 400. For example, if cleaning the electrodes is required, the control unit 487 may shut down the voltage supplied to the wire 440 and the screen 450. The control unit may further be configured to then operate the motor 485 so as to displace the wiper 475 along the electrodes in order to wipe the electrodes. The control unit may further be configured to thereafter shut down the motor 485, and, finally, turn on the voltage supplied to the wire 440 and the screen 450. While cleaning the electrodes, the control unit 487 may activate an indicator light indicating that cleaning of the electrodes is being performed.

The control unit 487 may include power terminals 488 (illustrated symbolically), for connection to a power source, e.g., the power grid. The control unit 487 may fulfil the function of adapting and supplying power to the different components of the air disinfection apparatus 400.

The design of the air disinfection apparatus 400 may be useful for incorporation into air conditioning systems, inside a duct segment of ducted air conditioning systems, or, alternatively, as part of an indoor unit of a split air conditioning system, or a part of standalone device with or without fan attached, or in combination with other air purifying devices.

Figure 5:
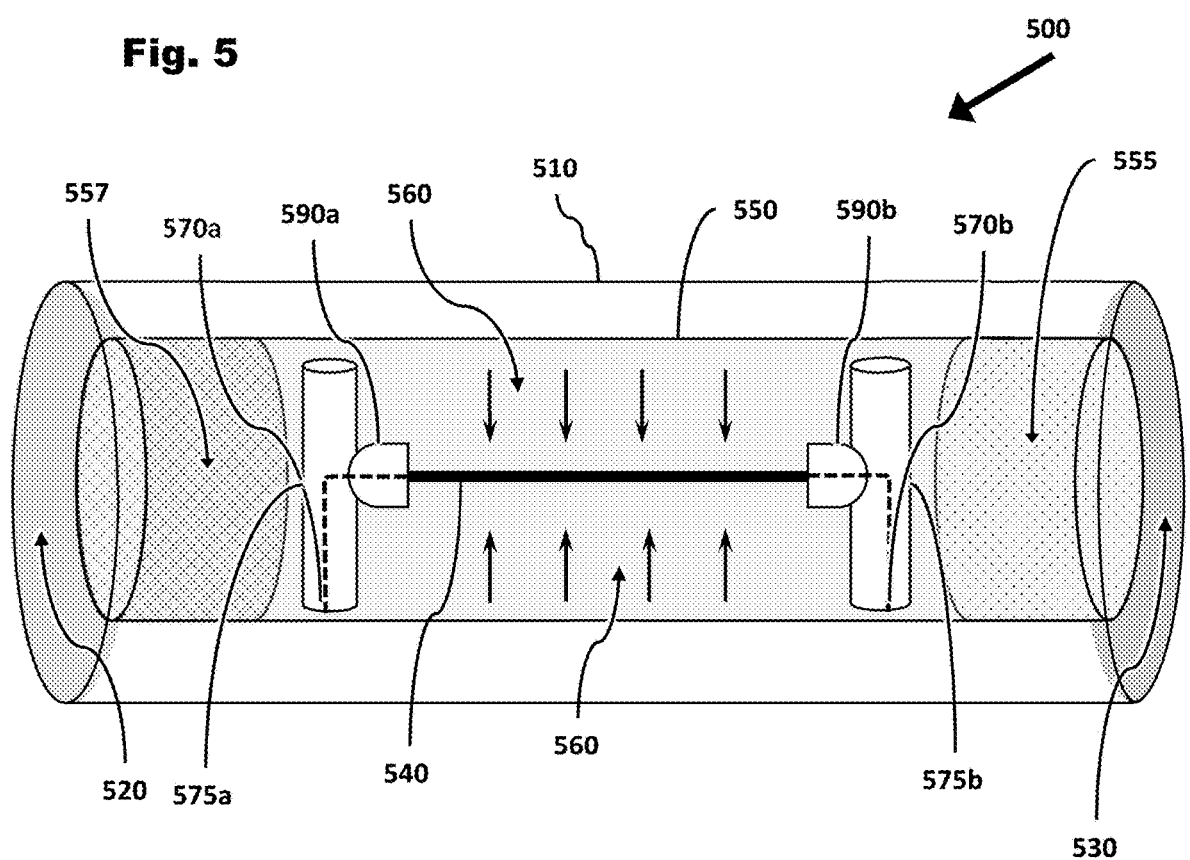
FIG. 5 shows a schematic illustration of an air disinfection apparatus according to embodiments of the present disclosure.

FIG. 5 shows a schematic illustration of an air disinfection apparatus 500 according to embodiments of the present invention. The housing 510 may be cylindrical, conical, or other tube-like structure or a part of it and hollow for conveying an airflow therethrough between an air inlet 520 and an opposite air outlet 530. The air inlet 520 and the air outlet 530 may be formed by bases of the cylinder.

The air disinfection apparatus 500 may comprise a screen 550 that may be barrel shaped, preferably cylindrical in shape. The screen 550 may be mounted in the housing 510 between the air inlet 520 and the air outlet 530. The screen 550 may extend along a screen longitudinal extension axis, that may be aligned with the airflow direction. The surface of the screen 550 may be tangential to the airflow direction.

The air disinfection apparatus 500 may comprise a wire 540. The wire 540 may be suspended in the housing 510 between the air inlet 520 and the air outlet 530. Holders 575a, 575b having a pole shape may support the wire 540. The poles 575a, 575b may be made of an insulating material such as plastic. The insulating poles 575a, 575b may be hollow. The wire may be embedded in the hollow poles. Electric terminals may be coupled to wires ends which may in some embodiments protrude from the insulating poles. The hollow insulating poles 575a, 575b may enable to connect the wire ends to a voltage generator e.g., via PCB card via the electric terminals. The screen 550 may surround the wire 540. A corona discharge zone 560 may be formed across the airflow between the wire 540 and the screen 550.

The positioning of the wire 540 may be so as to face screen surface, e.g., the wire 540 and the screen 550 may be coaxial. In other words, the wire 540 may be positioned so that an axis of the wire may be aligned with the direction of the airflow and may be aligned with the screen longitudinal extension axis. The benefit of such positioning, in comparison to positioning the wire 540 so that an axis of the wire may be aligned transversely to the airflow, is that the path of the air through the corona discharge zone 560 may be extended, and thus the disinfection process may be more efficient.

The wire 540 may comprise a first electrical terminal, that may include a back electrical terminal 570a and a front electrical terminal 570b or only one of them. In some embodiments, the back electrical terminal 570a and the front electrical terminal 570b may be embedded inside the poles 575a, 575b. The screen 550 may include a second electrical terminal (not shown). At least one of the electrical terminals may be electrically connected to the wire 540 and screen 550 for coupling them to high and low voltage outputs of a high voltage generator of sufficient voltage to create a corona discharge zone 560 across the airflow between the wire 540 and the screen 550.

The poles 575a, 575b may further comprise interruption barriers for example in the shape of cups 590a 590b, or other surface-interrupting barriers of different shape in order to prevent formation of current path from the wire to the screen. The interruption cups (or other surface interrupting barriers) 590a, 590b may be positioned on the poles 575a, 575b at a connection portion between the poles and the wire. The interruption cups may form a barrier configured to surround the wire 540 at the connection portion between the poles and the wire. The interruption cups 590a, 590b may form a physical insulating barrier between the conductive wire 540 and the insulating poles and electric terminals. The applicant has found that such barrier prevents formation of a conductive path that may be created, when dust and humidity is deposited on the insulating pole surface, between the electrical terminals and the wire. This may prevent current leakage through said conductive paths, weakening or blocking corona discharge current.

The screen 550 may comprise an ion receiver 555 and an upstream screen portion 557. The ion receiver 555 is marked with light dotting, and the upstream screen portion 557 is marked with dense dotting. The ion receiver 555 may be positioned downstream of the corona discharge zone 560 relative to the airflow direction and may be dimensioned to cause ions produced in the corona discharge zone 560 to be attracted to the ion receiver zones, so as to prevent release of ions outside of the air disinfection apparatus 500. The upstream screen portion 557 may be positioned upstream of the corona discharge zone 560 relative to the airflow direction. In some embodiments, the dimensions of the upstream screen portion 557 may be at least as large as the dimensions of the ion receiver 555. In some embodiments, the air inlet 520 and the air outlet 530 may be interchangeable.

The design of the air disinfection apparatus 500 may be useful for incorporation of the air disinfection apparatus 500 into air conditioning systems, preferably as a duct segment of ducted air conditioning systems or as a standalone device with or without airflow generator attached or in combination with other disinfection/air purifications/humidity or temperature controlling devices.

The air disinfection apparatus may further comprise a cleaning mechanism (not shown) configured to wipe the ionizing electrode, the non-ionizing electrode, the one or more focusing electrode and/or the ion receiver. In some embodiments, the cleaning mechanism includes a wiper configured to be displaced within the housing to cause concurrent wiping of any of the ionizing electrode, non-ionizing electrode, one or more focusing electrode and/or ion receiver. The cleaning mechanism may further comprise one or more shafts (optionally the focusing electrode may act as said shaft) extending parallel to the screen longitudinal extension axis, the wiper being coupled thereto so as to be axially guided within the housing. At least one of said shaft is configured to be axially rotatable and comprises a screw threading on an external surface thereof, and the wiper includes a nut cooperating with said screw threading, such that rotation of the shaft may cause displacement of the wiper along the shaft. Furthermore, the cleaning mechanism may be configured to be driven manually or by a motor.

The air disinfection apparatus may further include a focusing electrode (not shown). The focusing electrode may be placed inside the air disinfection apparatus 500. The focusing electrode may prevent the release of ions and the corona discharge outside of the air disinfection apparatus 500, due to electrical influences external to the air disinfection apparatus, e.g., high voltage sources such as high-power transformers. The focusing electrode may be free of electrical connection capability. Some ions may be trapped on the surface of the focusing electrode, thus charging the focusing electrode. The electric field produced by the trapped ions may deflect ions produced in the corona discharge zone towards the ion receiver. The focusing electrode may be grounded or under low voltage potential. The focusing electrode may be positioned in the corona discharge zone e.g., in the ions' path from the corona discharge zone or at the airflow outlet/inlet paths. The focusing electrode may be configured to extend so as to face the screen surface. The focusing electrode may extend parallel to the wire axis. In some embodiments, the focusing electrode may have the shape of a ring positioned concentric the wire. Focusing electrode may be of other geometries, in agreement with optimal structure to effectively block the ions inside the device. Positioning the focusing electrode so as to face the screen surface may enable efficient deflection of ions towards the ion receiver. The focusing electrode may be made of an electrically conductive material, in order to equalize the potential across the focusing electrode and to prevent spots of low potential that may cause ineffectual deflection of ions towards the ion receiver. The focusing electrode may be configured to have a cross section that is much smaller than the cross section of the housing or the air outlet, thus not constricting the airflow. The degree of focusing of the corona discharge zone may depend on the surface area of the focusing electrode that may face the ionizing electrode, and on the distance between the ionizing and focusing electrodes. In embodiments where the focusing electrode may have a circular cross section, the dependency on the surface area of the focusing electrode (that may face the ionizing electrode) may translate to dependency on the diameter of the focusing electrode. The focusing electrode may also eliminate the need for higher voltage in order to screen external electrical influences.

Figure 6:
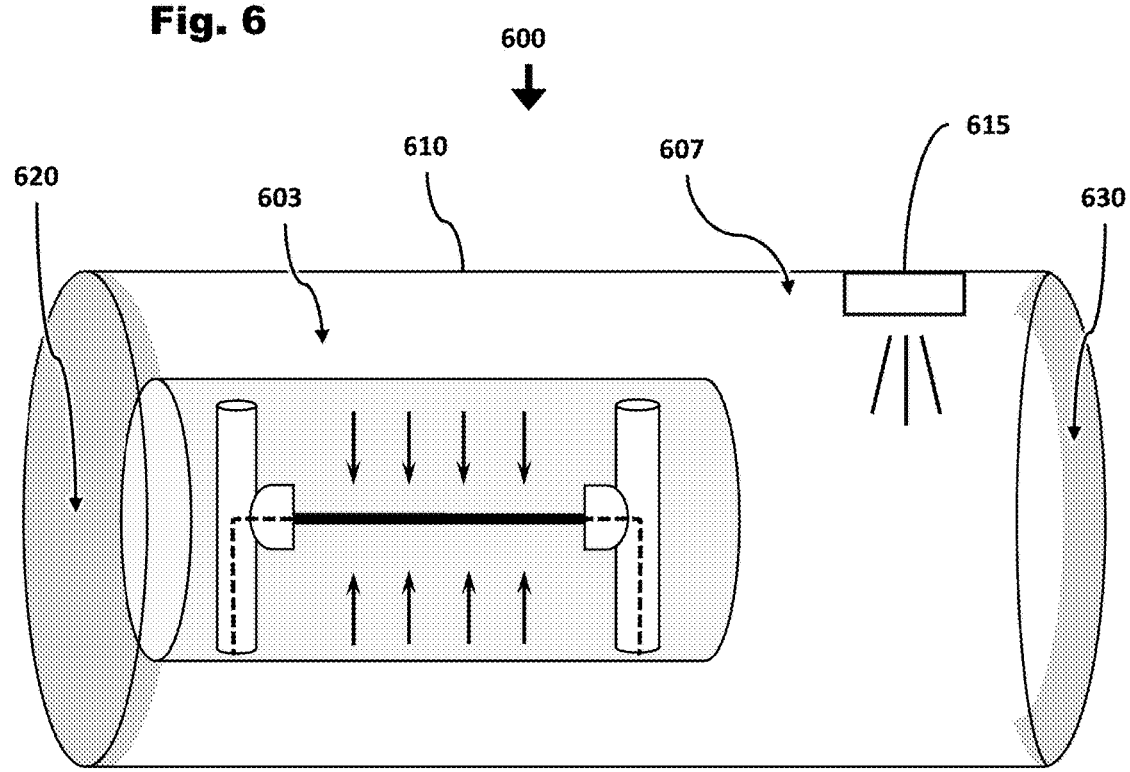
FIG. 6 shows a schematic illustration of an air disinfection apparatus according to embodiments of the present disclosure.

FIG. 6 shows a schematic illustration of an air disinfection apparatus 600 according to embodiments of the present disclosure. The air disinfection apparatus 600 may comprise two stages: a hydrogen peroxide generation stage 603, and an ozone decomposition and purification enhancer stage 607. The hydrogen peroxide generation stage 603 may generate hydrogen peroxide in order to disinfect air, and the ozone decomposition stage 607 may decompose ozone that may be generated as a byproduct of hydrogen peroxide generation by corona discharge.

The hydrogen peroxide generation stage 603 and the ozone decomposition and purification enhancer stage 607 may be placed inside a housing 610. The housing 610 may be used for conveying an airflow therethrough. The housing 610 may comprise an air inlet 520 and an air outlet 530. The air inlet 520 may be used for providing airflow to the air disinfection apparatus 600 and may fluidly communicate with the air disinfection stage 603. The air outlet 630 may provide an output for a disinfected airflow from the air disinfection apparatus 600 and may fluidly communicate with the ozone decomposition stage 607. The hydrogen peroxide generation stage 603 may fluidly communicate with the ozone decomposition stage 607. In other words, the ozone decomposition stage 607 may be positioned inside the housing 610 between the hydrogen peroxide generation stage 603, overlapping with hydrogen peroxide generation stage 603, or before the hydrogen generation stage 603, and the air outlet 630. The apparatus 600 may also be equipped with ion receivers (not shown) as described in apparatus 500 (zones 555 and 557). The apparatus 600 may also be equipped with focusing electrodes as described in apparatus 500.

The hydrogen peroxide generation stage 603 may include components for the generation of hydrogen peroxide, such as high voltage electrodes configured to create corona discharge, as described in some embodiments herein. For example, the hydrogen peroxide generation stage 603 may comprise components and configurations for the generation of hydrogen peroxide as described with reference to FIG. 5. In other words, the air disinfection apparatus 600, as schematically illustrated in FIG. 6, may be an air disinfection apparatus as described with reference to FIGS. 1-5, augmented with an ozone decomposition stage 607.

The ozone decomposition stage 607 may include a UV light source 615, that may generate UV radiation (e.g., UV-C radiation, or UVA/UVB with or without photocatalytic surfaces) or visible light with photocatalytic surfaces in contact with the light path. The light source may photochemically decompose ozone into regular oxygen and oxygen radicals, that may convert, in a chain reaction into hydrogen peroxide as well. In some embodiments, the decomposition of ozone by the UV radiation and visible light may be supported by a catalyst (e.g., platinum black).

Having described and illustrated the principles of the disclosed technology with reference to the illustrated embodiments, it will be recognized that the illustrated embodiments can be modified in arrangement and detail without departing from such principles. For instance, the technologies from any example can be combined with the technologies described in any one or more of the other examples.

The invention claimed is:

1. An air disinfection apparatus based on hydrogen peroxide for use with an air conditioning system configured to create an airflow, the air disinfection apparatus comprising:
    a hollow housing for conveying said airflow therethrough between an air inlet and an opposite air outlet in an airflow direction;
    a screen forming a non-ionizing electrode extending along a screen longitudinal extension axis, said non-ionizing electrode being mounted in the hollow housing between the air inlet and the opposite air outlet so that a screen surface is parallel to the airflow direction;
    a wire forming an ionizing electrode, said wire being suspended in said hollow housing between the air inlet and the opposite air outlet and having a wire axis aligned with the screen longitudinal extension axis so as to face said screen surface;
    terminals electrically connected to the wire and the screen for coupling thereto high and low voltage outputs of a high voltage generator of sufficient voltage to create a corona discharge zone across the airflow between the wire and the screen;
    wherein the screen includes an ion receiver screen portion positioned downstream of the corona discharge zone relative to the airflow direction, said ion receiver screen portion causing ions produced in the corona discharge zone to be attracted thereon, the ion receiver screen portion extending parallel to the airflow direction so as to prevent release of ions outside of the air disinfection apparatus.

2. The air disinfection apparatus according to claim 1, wherein the screen further comprises an upstream screen portion positioned upstream of the corona discharge zone relative to the airflow direction.

3. The air disinfection apparatus according to claim 2, being further configured so that the air inlet and the opposite air outlet can be used reversibly with respect to the airflow direction from the air conditioning system.

4. The air disinfection apparatus according to claim 1, further comprising one or more focusing electrodes accommodated in the corona discharge zone or in the air inlet and/or in the opposite air outlet and free of electrical connection to a voltage source, or grounded or connected to low voltage potential.

5. The air disinfection apparatus according to claim 4, wherein the one or more focusing electrodes are made of an electrically conductive material.

6. The air disinfection apparatus according to claim 4, wherein the one or more focusing electrodes are configured for preventing release of ions and corona current discharge on a surface outside of the air disinfection apparatus due to electrical influences external to the air disinfection apparatus.

7. The air disinfection apparatus according to claim 1, comprising a UV or visible light source, configured for decomposing ozone generated by the corona discharge in the corona discharge zone.

8. The air disinfection apparatus according to claim 1, wherein the screen forms a barrel surrounding the wire.

9. The air disinfection apparatus according to claim 8, wherein the screen longitudinal extension axis is aligned with the airflow direction.

10. The air disinfection apparatus according to claim 1, further comprising:
    (a) hollow insulating holders for suspending the wire and accommodating wire ends therethrough, and
    (b) interruption barriers at connection portions between said wire and the hollow insulating holders.

11. The air disinfection apparatus according to claim 1, wherein the screen forms a sheet.

12. The air disinfection apparatus according to claim 11, wherein the screen comprises two parallel sheets, the wire being mounted between said two parallel sheets.

13. The air disinfection apparatus according to claim 1, comprising a cleaning mechanism, said cleaning mechanism being configured to wipe the ionizing electrode.

14. The air disinfection apparatus according to claim 13, wherein the cleaning mechanism is further configured to wipe the non-ionizing electrode.

15. The air disinfection apparatus according to claim 13 further comprising one or more focusing electrodes accommodated in the corona discharge zone or in the air inlet and/or the opposite air outlet of the air disinfection apparatus and free of electrical connection to a voltage source, or grounded or connected to low voltage potential, wherein the cleaning mechanism is further configured to wipe the one or more focusing electrodes.

16. The air disinfection apparatus according to claim 15, wherein the cleaning mechanism includes a wiper configured to be displaced within the housing to cause concurrent wiping of any of the ionizing electrode, the non-ionizing electrode, and the one or more focusing electrodes.

17. The air disinfection apparatus according to claim 16, wherein the cleaning mechanism further comprises one or more shafts extending parallel to the screen longitudinal extension axis, the wiper being coupled thereto so as to be axially guided within the hollow housing.

18. The air disinfection apparatus according to claim 17, wherein (a) said one or more shafts is configured to be axially rotatable and comprises a screw threading on an external surface thereof, and (b) the wiper includes a nut cooperating with said screw threading, such that rotation of the one or more shafts causes displacement of the wiper along the shaft.

19. The air disinfection apparatus according to claim 17, further comprising one or more focusing electrodes accommodated in the corona discharge zone or in the air inlet and/or the opposite air outlet of the air disinfection apparatus and free of electrical connection to a voltage source, or grounded or connected to low voltage potential, wherein the one or more shafts forms a focusing electrode.

20. The air disinfection apparatus according to claim 13, wherein said cleaning mechanism is configured to be driven by a motor.

21. A method for generating hydrogen peroxide, the method comprising:
providing the air disinfection apparatus according to claim 1;
creating a corona discharge zone between said ionizing electrode and said non-ionizing electrode;
passing an airflow containing water molecules through said corona discharge zone, to thereby cause conversion of some of the water molecules into hydrogen peroxide.

* * * * *